United States Patent [19]
Coffey

[11] Patent Number: 5,435,557
[45] Date of Patent: Jul. 25, 1995

[54] VIDEO-GAME SCREEN DIVIDER

[76] Inventor: Timothy M. Coffey, 321 Crampton St., Reno, Nev. 89502

[21] Appl. No.: 295,010

[22] Filed: Aug. 23, 1994

[51] Int. Cl.⁶ ............................................. A63F 9/22
[52] U.S. Cl. ...................... 273/148 B; 273/DIG. 28; 273/DIG. 30
[58] Field of Search ............... 273/85 G, 148 B, 434, 273/DIG. 28, DIG. 30; 160/368.1, DIG. 3, DIG. 13, 370.2 R; 345/185

[56] References Cited

U.S. PATENT DOCUMENTS 1,468,197  9/1923  Downing ................. 160/DIG. 13
5,288,078  2/1994  Capper et al. ............ 273/148 B Primary Examiner—Raleigh W. Chiu

[57] ABSTRACT

A video-game apparatus that allows the displaying of secret-personalized information to each player of multiple-player-video-games, on one cathode ray tube or CRT. A panel of opaque material partitions the view of a television CRT into two independent areas; a left-side and a right-side. The panel is held vertical and perpendicular in front of the television CRT. There are numerous ways that the panel can be held in front of the CRT. However, in the main embodiment the panel is attached to the surface of the CRT screen by suction cups. Two video-game players, a left-player and a right-player, are positioned so that they can only see their respective side or view of the CRT screen. Images are displayed on the CRT screen so that the left-player's information is displayed on the left-side of the CRT, and the right-player's information is displayed on the right-side. The source of these images could come from computers, home-video game systems, CATV, or broadcast stations.

8 Claims, 5 Drawing Sheets

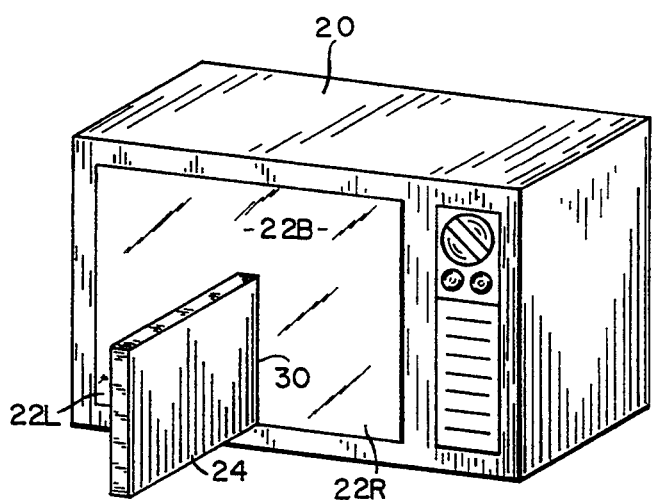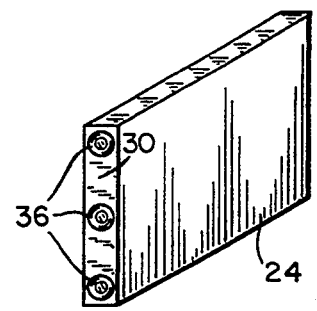
FIG. 4B
FIG. 4A
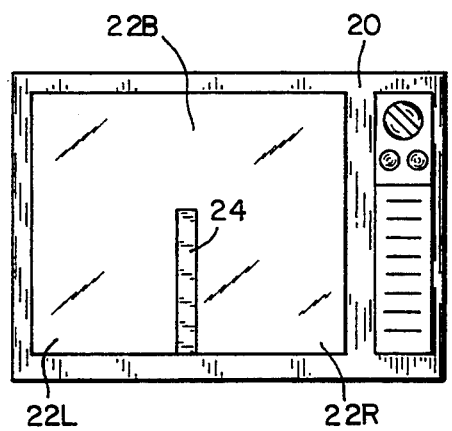
FIG. 5

VIDEO-GAME SCREEN DIVIDER

FIELD OF INVENTION

This invention relates to the field of video-game apparatuses that are used in combination with cathode-ray-tubes held in cabinets.

BACKGROUND

The problem a video-game screen divider solves is the displaying of secret-personalized information to each player of multiple-player-video-games, on one cathode-ray-tube or CRT. More specifically, each player's information needs to be hidden from the sight of the other player. For example, most card games rely on some element of secrecy, in that each player's cards can't be seen by another player. Currently, a CRT is used to display information to video-game players. In the past, video-game players could not play games of secrecy on one CRT, because each player was able to see the other player's information.

OBJECTS AND ADVANTAGES

Accordingly, several objects and advantages of a video-game screen divider are:
(a) to provide an apparatus that allows each player of multiple-player-video-games to only see their own secret information displayed on one CRT;
(b) to provide an apparatus that allows several video-game players to simultaneously play games of secrecy;
(c) to provide an apparatus that easily modifies an ordinary television receiver for the purpose of playing games, and then is easily removed for normal television viewing;

SUMMARY

Briefly, a video-game screen divider partitions the view of a CRT into a left-side and a right-side. Two players, a left-player and a right-player, can only see their respective side of the partitioned CRT. Thus allowing video games that rely on elements of secrecy to be developed and played.

DRAWINGS AND FIGURES

Sometimes in the drawings, there consists closely related figures, in these cases, the related figures have the same number but different alphabetic suffixes.

FIGS. 4a and 4b show isometric views of a video-game screen divider, in which only half of a CRT is partitioned.

FIG. 5 shows a front view of the video-game screen divider shown in FIG. 4a.

DESCRIPTION

Figure 1:
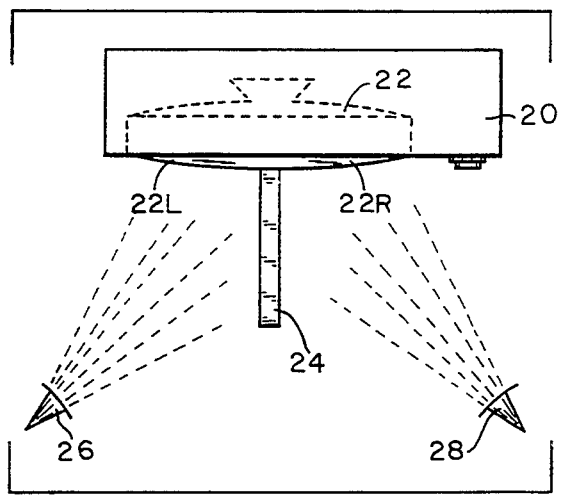
FIG. 1 shows a top view of a video-game screen divider attached to a CRT.

In FIG. 1 is a top view of a video-game screen divider. A cathode-ray-tube or CRT 22 is supported in a cabinet 20. A panel 24 made of an opaque material is held perpendicular to CRT 22 by mechanical or adhesive means. Panel 24 partitions CRT 22 into a left-side 22L and a right-side 22R. A left-player 26 is positioned so that he can only see left-side 22L. A right-player 28 is positioned so that he can only see right-side 22R. Conventional methods are used to display images on CRT 20 simultaneously to both left-player 26 on left-side 22L, and to right-player 28 on right-side 22R (not shown). The source of the images displayed on left-side 22L and right-side 22R of CRT 22 could come from computers, home-video-game systems, CATV, or broadcast stations (not shown).

Figure 2A:
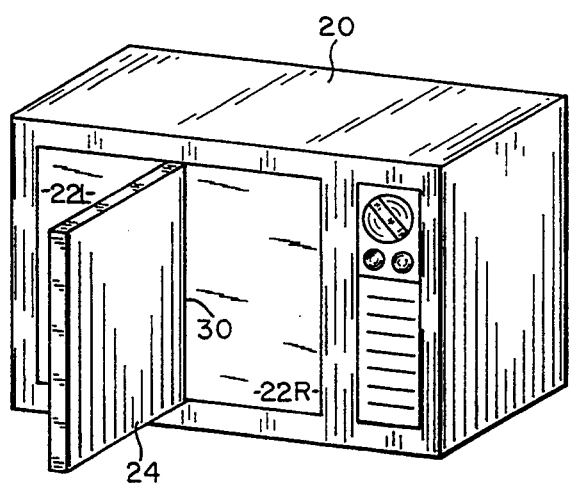
FIGS. 2a and 2b show isometric views of a video-game screen divider that is attached to the surface of a CRT by suction cups, and one that is unattached respectively.
Figure 2B:
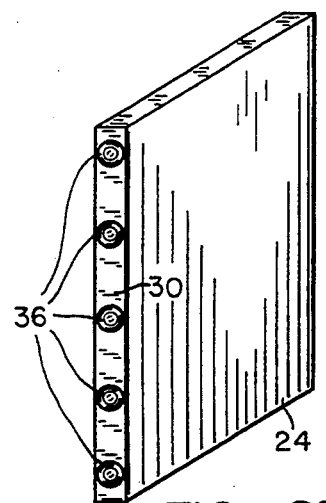

Another view of a video-game screen divider is shown in FIGS. 2a and 2b. In FIG. 2a panel 24 is attached to CRT 22, and in FIG. 2b panel 24 is unattached. Panel 24 has a plurality of suction-cups 36 equally spaced and glued on an edge 30. Suction-cups 36 attach edge 30 of panel 24 to the surface of CRT 22. Panel 24 is held vertical and perpendicular in the middle of CRT 22. Again, panel 24 partitions the view of CRT 22 display into left-side 22L and right-side 22R.

Panel 24 can have a variety of dimensions. The preferred thickness being less than 1.5 cm. The width is approximately half the width of CRT 22. A good width is somewhere in the range of 15 to 23 cm. Panel 24 has height equal to the height of CRT 22.

Panel 24 is made of an opaque material. This material could include cardboard, wood, plastic, rubber, fabric, metal, etc. . . . The preferred material is a polyurethane-foam that has been dyed or painted black. Foam is a good material because it is lightweight, easy to shape, and relatively inexpensive.

The plurality of suction-cups 36 can also have a variety of dimensions. However, the preferred diameter of suction-cups 36 is less that the thickness of panel 24. The number of suction-cups 36 needs to be large enough so that they can support the weight of panel 24, once panel 24 is attached to the surface of CRT 22. As shown in FIG. 2b, the preferred number of suction cups 36 is five.

Figure 3:
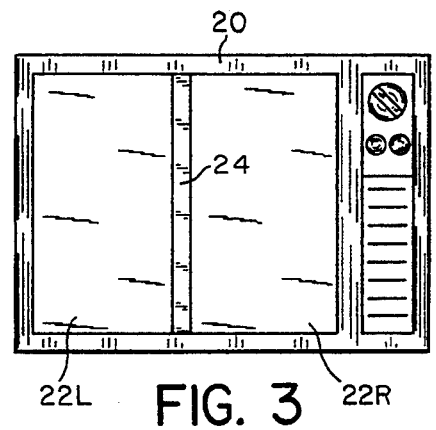
FIG. 3 shows a front view of a video-game screen divider.

A front view of a video-game screen divider is shown in FIG. 3. Seen more clearly is how panel 24 partitions CRT 22 into the two sections, left-side 22L and right-side 22R. Also seen is the role of the thickness of panel 24. The thicker panel 24 is made, the smaller left-side 22L and right-side 22R become.

The following FIGS. 4a, 4b, and 5 show different views of a variation of the previous video-game screen divider. The difference being that the height of panel 24 has been cut in half, so that it cuts CRT 22 into three regions; left-side 22L, right-side 22R, and a shared-view 22B. Left-player 26 positions himself so that he can only see left-side 22L and shared-view 22B. Right-player 28 positions himself so that he can only see right-side 22R and shared-view 22B.

Figure 6A:
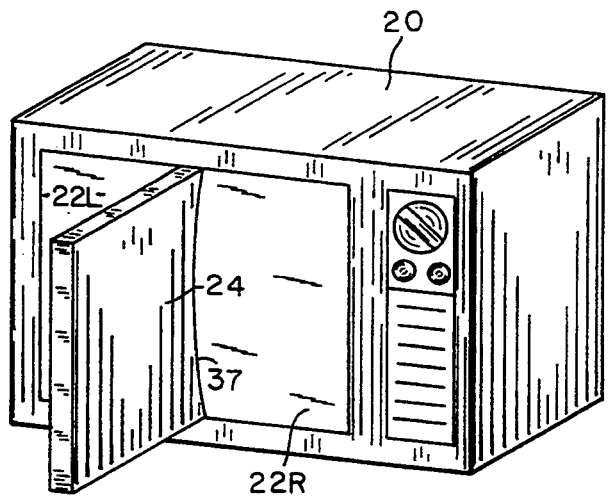
FIGS. 6a and 6b show a video-game screen divider that has a concavity to conform to the curve of some CRT screens.
Figure 6B:
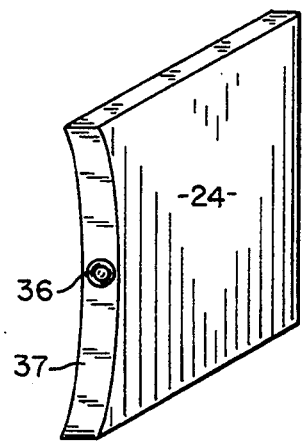

Another variation of panel 24 is shown in FIGS. 6a, and 6b. Panel 24 has been cut so that a concaved side 37 is formed. Concaved side 37 conforms to the convex curve of CRT 22. Also the plurality of suction cups 36 has been reduced to just one suction cup 36. The suction cup 36 is glued in the middle of concaved side 37 of panel 24, and attaches to the surface of CRT 22.

Figure 7A:
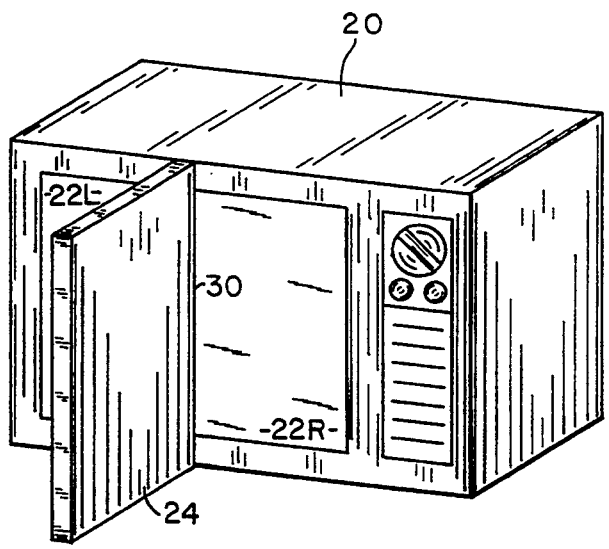
FIGS. 7a and 7b show a video-game screen divider that is attached to the cabinet of a CRT by suction cups.
Figure 7B:
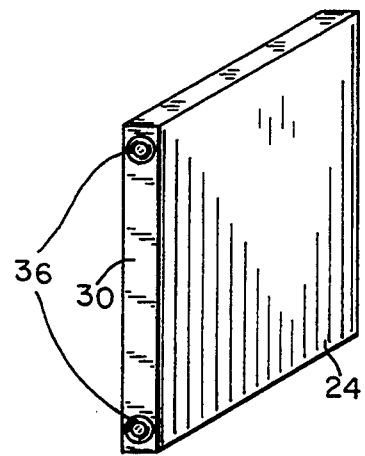

Instead of panel 24 being attached to CRT 22, it can be attached to cabinet 20 as shown in FIGS. 7a, and 7b. Panel 24 has height equal to the height of cabinet 20. Suction cups 36 are glued on the upper and lower ends of edge 30 of panel 24, and attach to cabinet 20. In this case, suction cups 36 can be replaced with any other fasteners or connectors (not shown), that are capable of attaching panel 24 to cabinet 20. For example, a hook-and-latch-type device.

Figure 8:
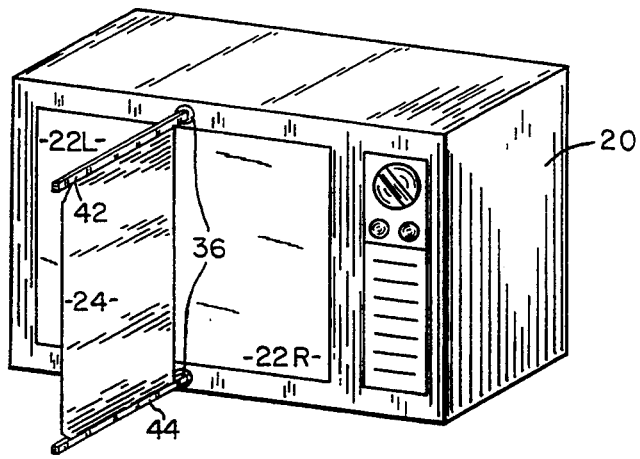
FIG. 8 shows an isometric view of a video-game screen divider that is attached to the cabinet of a CRT by two supports and suction cups.

Another variation of a video-game screen divider is shown in FIG. 8. Panel 24 is held in a vertical and perpendicular fashion by a top support 42 and a bottom support 44. Supports 42 and 44 are made of any rigid material such as wood, metal, plastic, etc. Supports 42 and 44 have a length slightly larger than the width of panel 24. Width and thickness for supports 42 and 44 are in the range of 0.5 to 1.5 cm. Suction cups 36 are glued to one end of both top support 42 and to bottom support 44. Suction cups 36 attach to cabinet 20. Again, suction cups 36 can be replaced with any other fasteners or connectors (not shown), that are capable of attaching supports 42 and 44 to cabinet 20. For example, a hook-and-latch-type device.

Figure 9A:
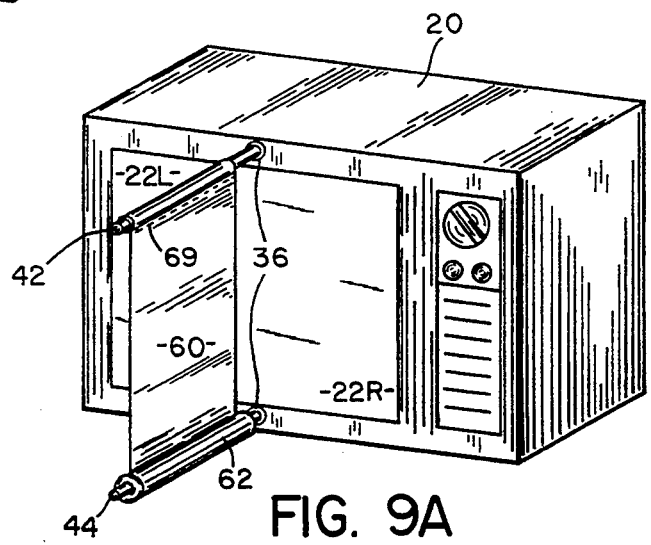
FIGS. 9a and 9b show a video-game screen divider that is made out of fabric, and is attached to the cabinet of a CRT by two supports and suction cups.

In FIG. 9a is a variation of the video-game screen divider shown in FIG. 8. Panel 24 has been replaced with a piece of opaque material 60. Two supports 42 and 44 are sewn on opposite ends of fabric 60, resulting in stitching 69. Supports 42 and 44 are made of any rigid material such as wood, metal, plastic, etc. Supports 42 and 44 have a length slightly larger than the width of fabric 60. The width and thickness of supports 42 and 44 is 0.5 cm. Fabric 60 is rolled around bottom support 44 to form a take-up reel 62, to adjust to the height of cabinet 20. Suction cups 36 are glued to one end of supports 42 and 44, and attach to cabinet 20.

Figure 9B:
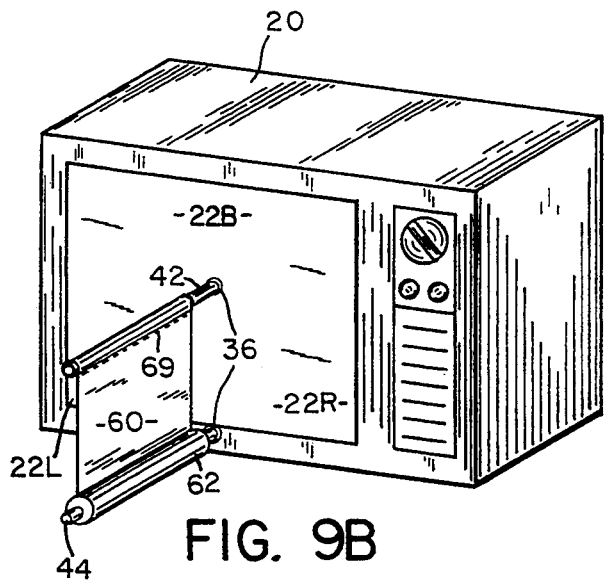

FIG. 9b shows an advantage of the video-game screen divider of FIG. 9a. Fabric 60 can be rolled more on to take-up reel 62 so that only the bottom half of CRT 22 is partitioned; forming left-side 22L, right-side 22R, and shared-view 22B.

Figure 10A:
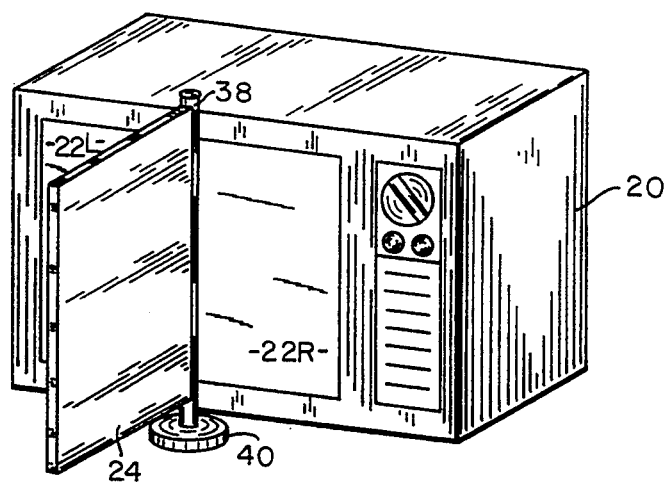
FIGS. 10a and 10b show a video-game screen divider that is unattached from a CRT, but is positioned in front of the CRT by a weight and a stand.

Another variation of a video-game screen divider is shown in FIG. 10a. Panel 24 is unattached from CRT 22 and cabinet 20. Instead, panel 24 is held in front of CRT 22 by a support 38 and a weight 40. Support 38 can be made out any rigid material such as wood, metal, plastic, etc. The width and thickness of support 38 is 0.5 cm. The height of support 38 is slightly larger than the height of cabinet 20. Weight 40 is connected to the bottom of support 38. Weight 40 is heavy enough so that panel 24 is held in place.

Figure 10B:
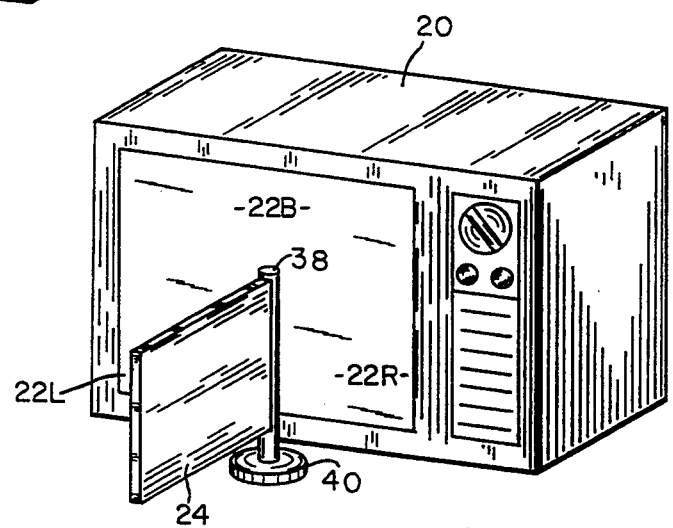

FIG. 10b shows a variation of the video-game screen divider shown in FIG. 10a. The height of panel 24 has been cut in half forming left-side 22L, right-side 22R, and shared-view 22B.

Figure 11:
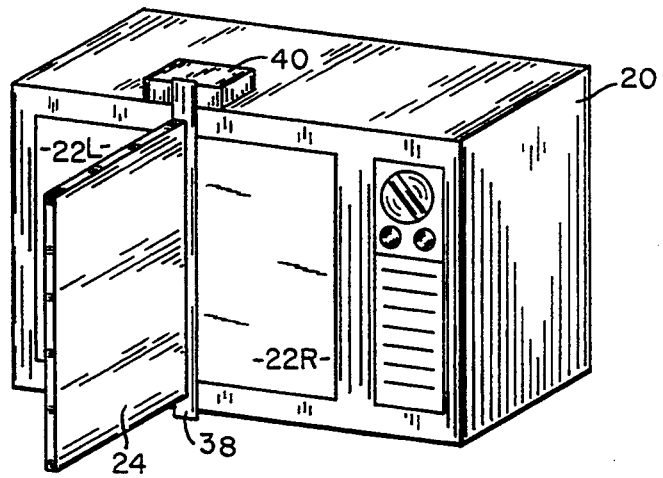
FIG. 11 shows a video-game screen divider that is positioned in front of a CRT by a weight that rests on top of the CRT cabinet.

FIG. 11 shows a variation of the video-game screen divider of FIG. 10a. Weight 40 has been moved from the bottom of support 38 to the top. Weight 40 rests on top of cabinet 20. Weight 40 is heavy enough so that panel 24 is held in place.

OPERATION

The first step in using a video-game screen divider is to create a video-game that is compatible with a video-game screen divider. The programmer or game designer uses the same methods and techniques that he uses today to create video-games. The only difference being that whatever he wants left-player 26 to see he displays on left-side 22L of CRT 22. And whatever he wants right-player 28 to see he displays on right-side 22R of CRT 22. Typical games that the programmer could create could be; card games, hide-n-seek type games, cat-n-mouse type games, etc. . . . The video-games can run or operate on the same computers or home-video-game-systems that are currently in use today.

The next step in using a video game screen divider is to attach panel 24 in front of or to the surface of CRT 22. A player places panel 24 vertical and perpendicular in a predetermined position, usually in the middle of CRT 22. For the video-game screen dividers shown in FIGS. 2a, 4a, and 6a panel 24 is held by depressing suction cups 36 onto the surface of CRT 22. In FIGS. 7a, 8, 9a, and 9b panel 24 is held by depressing suction cups 36 onto cabinet 20. In FIGS. 10a, and 10b panel 24 is held by balancing weight 40 and stand 38 in front of CRT 22. And in FIG. 11 panel 24 is held by placing weight 40 on top of cabinet 20.

Now the two video-game players position themselves in front of the display of CRT 22. As shown in FIG. 1 left-player 26 arranges himself so that he can only see left-side 22L of CRT 22; and right-player 22L arranges himself so that he can only see right-side 22R of CRT 22.

The players now play the video-game in the same manner that they do today, whether it be computers or home-video-game-systems.

Lastly, when the players are done playing, one player removes panel 24 from CRT 22. In FIGS. 2a, 4a, and 6a panel 24 is removed by pulling suction cups 36 off the surface of CRT 22. In FIGS. 7a, 8, 9a, and 9b panel 24 is removed by pulling suction sups 36 off cabinet 20. In FIGS. 10a, 10b, and 11 panel 24 is removed by picking up weight 40 and moving the video-game screen divider away from the front of CRT 22.

SUMMARY, RAMIFICRTIONS AND SCOPE

Therefore, a video-game screen divider allows secret and personalized information to be displayed to each player of multiple-player-video-games on one CRT. A video-game screen divider also allows games that rely on secrecy to be developed and played. Also, a video game screen divider easy adapts on ordinary television for playing games, and then is easily removed for normal television viewing.

Although the above description has many specifics, these should not limit the scope of the invention. There are numerous aesthetic changes that can be made to a video-game screen divider. For example, panel 24 can be made with a variety of colors or designs. Panel 24 can also be made having different shapes or sizes; such as beveled or rounded corners. As shown in the descriptive figures above panel 24 can be held in front of CRT 22 in countless ways. Those figures presented are only the preferred methods of attaching or placing panel 24 in front of CRT 22. Many arrangements can be conceived that are capable of holding panel 24 in front of CRT 22. These arrangements could include using many other types of support mechanisms, fasteners, or connectors.

Therefore, the scope of the invention should be determined from the appended claims, rather than by the examples given.

I claim:

1. A video-game apparatus in combination with a cathode-ray-tube held in a cabinet, said apparatus comprising, (a) a sheet of opaque planar material with predetermined width and thickness and height approximate to that of said cathode-ray-tube, (b) attachable means for holding said sheet of opaque planar material in front of said cathode-ray-tube held in said cabinet in a vertical and perpendicular like fashion, whereby said sheet of opaque planar material acts as a partition between the left and right sides of said cathode-ray-tube, for the purpose of playing games.

2. A video-game apparatus in accordance with claim 1 wherein said sheet is made out of polyurethane-foam.

3. A video-game apparatus in accordance with claim 1 wherein said sheet is made of fabric.

4. A video-game apparatus in accordance with claim 1 wherein said sheet has height that is a fraction of the height of said cathode-ray-tube.

5. A video-game apparatus in accordance with claim 1 wherein said sheet has a concaved side.

6. A video-game apparatus in accordance with claim 1 wherein said attachable means is achieved with suction cups.

7. A video-game apparatus in accordance with claim 1 wherein said attachable means is achieved by a support and a weight.

8. A video-game apparatus in accordance with claim 1 wherein said attachable means is achieved by supports and suction cups.

* * * * *